US 6,625,776 B1

(12) United States Patent
Wright et al.

(10) Patent No.: US 6,625,776 B1
(45) Date of Patent: Sep. 23, 2003

(54) ADAPTIVE CODING SCHEME FOR A PROCESSING COMMUNICATIONS SATELLITE

(75) Inventors: David A. Wright, Solana Beach, CA (US); Stuart T. Linsky, San Pedro, CA (US); Donald C. Wilcoxson, Redondo Beach, CA (US); Eldad Perahia, Hermosa Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/163,775

(22) Filed: Sep. 30, 1998

(51) Int. Cl.[7] .............................................. H03M 13/00
(52) U.S. Cl. ...................................... 714/774; 714/704
(58) Field of Search ................................ 714/774, 704, 714/752, 812, 708, 810; 375/224, 130; 369/13.02

(56) References Cited

U.S. PATENT DOCUMENTS

| 4,701,923 A | 10/1987 | Fukasawa et al. ........... 714/774 |
| 4,800,570 A | 1/1989 | Perrotta et al. ............. 375/214 |
| 5,473,601 A | 12/1995 | Rosen et al. ................ 370/319 |
| 5,490,168 A | 2/1996 | Phillips et al. .............. 375/224 |
| 5,511,079 A | 4/1996 | Dillon ........................ 714/774 |
| 5,541,955 A | 7/1996 | Jacobsmeyer ............... 375/222 |
| 5,600,663 A | 2/1997 | Ayanoglu et al. ........... 714/774 |
| 5,625,624 A | 4/1997 | Rosen et al. ................ 370/307 |
| 5,699,365 A | 12/1997 | Klayman et al. ............ 714/708 |
| 5,729,557 A | 3/1998 | Gardner et al. ............. 714/774 |
| 5,757,813 A | 5/1998 | Raith ......................... 714/708 |
| 6,320,850 B1 * | 11/2001 | Perahia et al. .............. 714/774 |

FOREIGN PATENT DOCUMENTS

| EP | 772317 A2 * | 7/1997 | ............. H04L/1/00 |
| WO | 9711535 | 3/1997 | |
| WO | 9803030 | 1/1998 | |

* cited by examiner

*Primary Examiner*—Albert Decady
*Assistant Examiner*—Mujtaba K. Chaudry
(74) *Attorney, Agent, or Firm*—McAndrews, Held & Malloy, Ltd.

(57) ABSTRACT

The present invention provides a comprehensive method for controlling, independently, transmit power and coding levels for data transmitted in uplinks and downlinks. One preferred embodiment of the present invention provides a method for adaptive coding of data in a downlink. A data error rate associated with downlink data (e.g., a character error rate provided by a Reed Solomon decoder) is determined. The method, based upon pre-established error rate thresholds, controls the level of coding (e.g., heavy or light) on data in the downlink to achieve a desired data error rate. Heavy coded data is typically associated with a code rate half that of light coded data, and changes between heavy and light coding may be selected using a destination address applied at an originating terminal and interpreted at the satellite.

24 Claims, 5 Drawing Sheets

ADAPTIVE CODING SCHEME FOR A PROCESSING COMMUNICATIONS SATELLITE

BACKGROUND OF THE INVENTION

The present invention relates generally to satellite communication systems, and more particularly to a method for adaptive error coding in a processing communication satellite system which optimizes data throughput in accordance with changing signal propagation conditions.

Satellites have long been used to provide communications capabilities on a global scale, allowing various earth terminals to communicate with each other via a satellite relay system. Typically, a satellite includes multiple uplink and downlink antennas, each of which provides communications bandwidth to a large coverage area (or "footprint") using multiple spot beams. The area covered by a spot beam is often referred to as a "cell".

A sophisticated processing satellite that demodulates and decodes uplink data and then switches that data and re-encodes and re-modulates it on the downlink may be used in the satellite relay system. Typically, a Network Operation Control Center (NOC) is also provided to generate command signals that control the satellite relay system and coordinate assignment of traffic channels in uplinks and downlinks. A typical system employs frequency and time division multiplexing (FDMA/TDMA) on uplinks and time division multiplexing (TDM) on downlinks. However, other multiplexing schemes may readily be used in either of the links.

Because the data sent to and from the satellite is susceptible to significant degradation by, for example, atmospheric conditions such as rain or by satellite antenna pointing error, the data is encoded with error detection and correction codes. Two types of error detection and correction codes are typically used, convolutional codes and block codes. Characteristics of the various techniques, for error control are extensively covered in the literature. In modern satellite communication systems a "concatenated" set of error detection and correction codes is typically applied to the data. Concatenated coding refers to the sequence of coding in which a second coding operation is performed upon already encoded data. The "outer code" of the concatenated coding is the first code applied (typically a block code), while the "inner code" of the concatenated coding is the second code applied (typically a convolutional code in downlink usage or a short block code in uplink usage).

A block code essentially adds parity bits to each predefined number of bits in a data channel (an information block). In processing satellites, a variety of block codes known as Reed-Solomon codes are typically used to outer encode both the uplink and downlink signals. The block outer encoded data is then further encoded with a convolutional code on the downlink or a short block code on the uplink to reduce the bit error rate (BER) to a tolerable level (the BER is the ratio of incorrectly received information bits to the total number of received information bits). The ratio of the number of information (or data) bits to the number of data bits plus error correction bits is commonly called the "code rate".

The earth terminals which communicate via the satellite may be separated by a great distance and typically experience different and independent levels of signal degradation. In addition, the gain in the antenna's footprint and the antenna pointing errors are typically different for each terminal.

Most ground stations, however, do not concurrently experience the worst case signal degradation at any given time. In the past, concatenated error detection and correction codes have been used to achieve performance tailored to the worst-case signal degradation. Thus, in the past, bandwidth has been wasted by over-encoding the uplink and downlink with error correcting data that is not needed by the ground station most of the time. Wasted bandwidth results in inefficient communication, reduced throughput, and lost revenue. Additionally, past systems have failed to provide a simple relationship between changes in coding (or even a simple, effective inner code to replace the convolutional code) that allowed efficient processing on the satellite.

Furthermore, previous terminals continued transmission even when signal conditions deteriorated beyond the correction ability of the strongest error detection and protection code. Again, bandwidth, time, and power are wasted because the receiver cannot accurately decode the data transmitted to it under such conditions. Thus, even systems that change transmitter coding to a lighter or heavier level, such as that illustrated in U.S. Pat. No. 5,699,365 entitled "Apparatus and method for adaptive forward error correction in data communications" by Klayman, allow the transmitters to continue transmitting beyond the ability of the receiver to decode the data.

A need has long existed in the industry for an efficient and effective method for adaptive error coding in a satellite communications system.

BRIEF SUMMARY OF THE INVENTION

It is an object of the present invention to provide an adaptive coding scheme for a processing satellite.

It is another object of the present invention to provide a mechanism by which originating terminals may suspend transmission when their data cannot be reliably decoded by destination terminals and to resume transmission when conditions warrant.

Yet another object of the present invention is to adaptively apply coding either to data transmitted in an uplink from an affected terminal "A", to a corresponding terminal "B", or to data transmitted in the downlink to an affected terminal A which is being relayed from a corresponding terminal B or both, and to do so independently for the uplink from A and the downlink to A and without requiring adaptation of links between the corresponding terminal B and the satellite.

Another object of the present invention is to provide hysteresis between adaptive changes in coding.

Still another object of the present invention is to provide a relationship between coding levels that allows the coded data to be handled efficiently.

One preferred embodiment of the present invention provides a method for adaptive error control coding of data in a downlink. The method includes the steps of receiving at terminal A a first signal containing light coded data transmitted in A's downlink from the satellite and determining a first data error rate associated with said first signal. When the first data error rate exceeds a first threshold (for example, a light-to-heavy threshold), the method commands the originating terminal B to subsequently select addressing which will result in transmission of heavy coded data in the downlink to A. The heavy coded data has a code rate less than that of the light coded data.

The method also continues to receive at the destination terminal A the first signal containing light coded data in A's downlink from the satellite and continues to determine the first data error rate associated with the first signal. If and when the first data error rate subsequently falls below a second threshold, the method commands the originating terminal B to subsequently select addressing which will result in transmission of light coded data (i.e., if it was currently transmitting heavy coded data) in the downlink to A.

Furthermore, the method may establish an enter-suspension threshold and determine a second data error rate associated with the heavy coded data. The method may then command each originating terminal B to suspend transmission when the second data error rate exceeds the enter-suspension threshold. Additionally, the method may establish an exit-suspension threshold separated from the enter-suspension threshold by a suspension hysteresis. The method may then command the first originating terminal B to resume transmission when the second data error rate falls below the exit-suspension threshold.

Heavy coded data in the downlink is typically associated with a rate 3/8 inner convolutional code applied at the satellite, while the light coded data in the downlink is typically associated with a rate 3/4 convolutional code. In the uplink from originating terminal B, heavy and light coded data in affected terminal A's downlink typically results from the addressing used by B and is independent of the light or heavy coding applied by the originating terminal B itself. Preferably, the originating terminal sets an address bit, for example, a bit in a Virtual Path Indicator (VPI) field of an Asynchronous Transfer Mode (ATM) cell, to indicate to the satellite which type of coding to apply on the downlink.

Additionally, the present invention provides a method for adaptive error control coding of data in an uplink based on the power level indicator value at the final amplifier of the originating terminal A. This power level is controlled in a closed loop by command from the satellite to maintain one of two predetermined levels as seen at the satellite depending on whether the heavy code or light code is in use on the uplink. The method includes the steps of sending in an uplink, by an affected terminal A, light coded data addressed to a first destination terminal B and determining a light coded data power indicator value associated with the light coded data. When the light coded data power indicator value exceeds a first threshold, the affected terminal A requests transfer of its uplink to a heavy channel and subsequently sends heavy coded data.

The method further determines a first heavy coded power indicator value, associated, for example, with the heavy coded data transmitted by the affected terminal A. When the heavy coded power indicator value falls below a first threshold, the affected terminal A requests transfer of its uplink to a light channel and subsequently sends light coded data. When the first heavy coded power indicator value exceeds a second threshold, the method suspends transmissions from the affected terminal A. When suspended, however, the affected terminal may continue to transmit synchronization bursts.

In order to send heavy coded data, the method may apply a particular inner code in a concatenated coding scheme, for example, an (8, 4) or (16, 8) block code. Similarly, when sending light coded data, the method may apply a different inner code or no inner code (a "rate 1" code). Preferably, the code rate of the heavy coded data is half that of the light coded data.

DETAILED DESCRIPTION OF THE INVENTION

Figure 1:
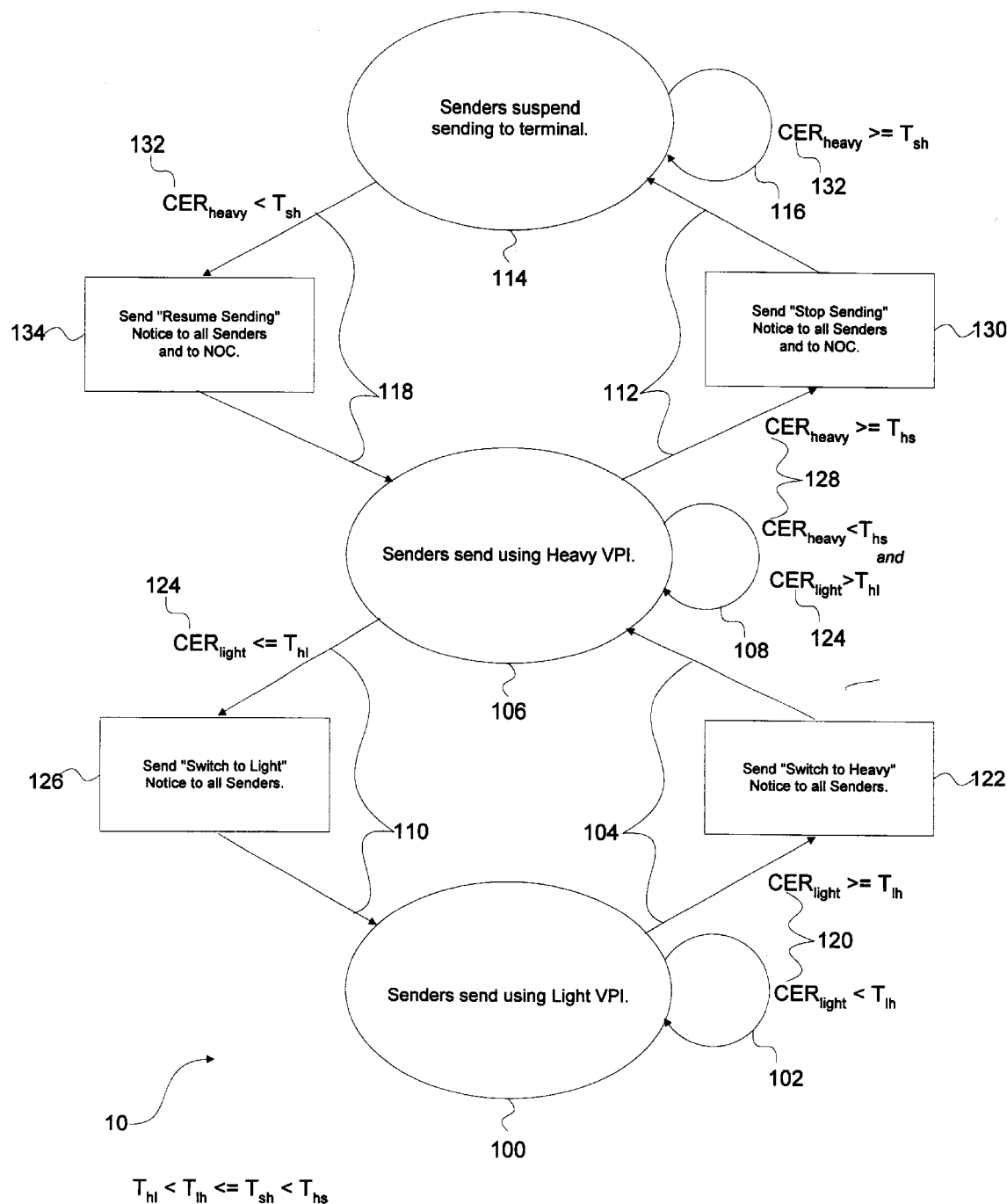
FIG. 1 shows a downlink State and Action Diagram for downlink adaptive error control coding according to the present invention.

Turning to FIG. 1, that Figure shows a state and action diagram 10 for a preferred embodiment of adaptive error encoding of downlink data according to the present invention. FIG. 1 shows a light-encoding state 100 with a maintain-light-encoding transition 102, as well as a light-to-heavy transition 104 from the light-encoding state 100 to a heavy-encoding state 106. From the heavy-encoding state 106 there is a maintain-heavy-encoding transition 108 and a heavy-to-light transition 110. In addition, there is an enter-suspension transition 112 from the heavy-encoding state 106 to a suspension state 114. FIG. 1 also shows a maintain-suspension transition 116 and an exit-suspension transition 118.

As used throughout the remainder of this specification, an "affected terminal A" is the terminal at which the adaptive coding action is being performed relative to itself, and the "corresponding terminal B" is the terminal that sends to, or receives from, the affected terminal. Both the affected terminal and the corresponding terminal may be either the originating terminal where the message originates, or the destination terminal where the message is received.

An affected terminal A receives a mixture of light and heavy coded data from the satellite in its downlink. The affected terminal determines a data error rate associated with the light coded data present in the downlink. As an example, the data error rate may be a Bit Error Rate, Character Error Rate, or the like. Although the discussion below proceeds with reference to Character Error Rate (CER), the invention is not limited thereto.

Figure 4:
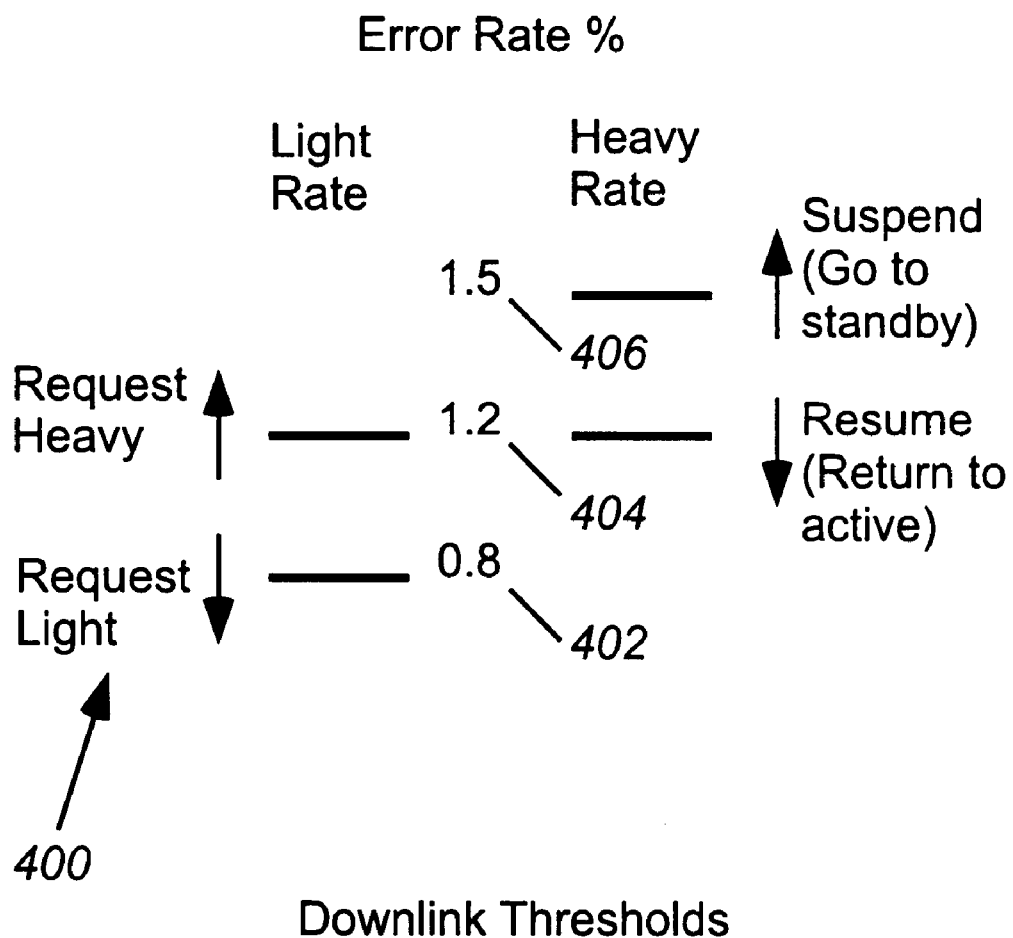
FIG. 4 shows one possible set of downlink thresholds suitable for use with the present invention.

The discussion below of the operation of the present invention as shown in FIG. 1 is supplemented by the downlink threshold diagram 400 illustrated in FIG. 4. The threshold diagram 400 shows, as examples, error rates of 0.8% (402), 1.2% (404), and 1.5% (406). The 1.2% error rate 404 may be used as the threshold at which the satellite preferably switches from light coding the downlink to heavy coding the downlink ($T_{lh}$ below) in response to addressing changes at an originating terminal B, as discussed in more detail below. Additionally, the 0.8% error rate 402 may be used as the threshold at which the satellite switches from heavy coding the downlink to light coding the downlink ($T_{hl}$ below). The 1.5% error rate 406 may be used as the threshold above which an originating terminal B is commanded to suspend transmissions through the satellite ($T_{hs}$ below) The originating terminal B may then reactivate downlink transmissions when the error rate, for example, falls below $T_{lh}$.

Returning to FIG. 1, the destination terminal measures a CER for the light coded data present in its downlink ($CER_{light}$) 120 and compares the $CER_{light}$ 120 to the light-to-heavy threshold $T_{lh}$ (which may be on the order of 1.2%, for example). In the preferred embodiment the CER is the CER observed at a decoder for a Reed-Solomon block code used as the outer code on the data in the downlink. Both $CER_{light}$ and $CER_{heavy}$ are so established. If the value of $CER_{light}$ 120 is less than $T_{lh}$ the destination terminal remains in the light-encoding state 100, as illustrated by the maintain-light-encoding transition 102. Otherwise, the destination terminal A sends a switch-to-heavy notice 122 to all originating terminals B that are sending to the affected terminal A, commanding them to select addressing which will result in heavy encoding for all subsequent data transmitted in the downlink to A. The affected terminal A then transitions to the heavy-encoding state 106, through the light-to-heavy transition 104.

While the affected terminal A is in the heavy-encoding state 106, terminal A expects to receive heavy coded data from each originating terminal B. In the preferred embodiment, there is a proportional relationship between the heavy and light error encoding rates. The proportional relationship may match the code rate adaptation to the time multiplexing and synchronization structure of the satellite communications system. In the preferred embodiment, the heavy error-coding rate is 1/2 the light error-coding rate. Accordingly, a frame of downlink data bearing heavy code blocks contains half the information content (payload) of frame bearing blocks encoded using light error coding. Therefore, twice as much light coded data may be transmitted in the same downlink time frame as the amount of heavy coded data that could be transmitted. Thus, the rate adaptation according to the present invention minimizes the need for interruption of synchronization and changes in the frame sizes.

As an example of the two to one relationship between the light and heavy error rates, the heavy coded data may use a rate 3/8 convolutional code, while the light coded data uses a rate 3/4 convolutional code. While the data addressed to the destination terminal is encoded at the heavy coding rate, the downlink beam typically contains light coded data addressed to other terminals, for example in different downlink frames, thus permitting the aforementioned light and heavy error rates to be monitored concurrently.

Therefore, the destination terminal may determine the Character Error Rate of such light coded data ($CER_{light}$) 124 and compare it to the heavy-to-light threshold $T_{hl}$ (which may be on the order of 0.8%). If the value of $CER_{light}$ 124 falls below $T_{hl}$, while the terminal is in heavy mode 106, the terminal may send a switch-to-light notice 126 to all originating terminals (senders), commanding them to use light encoding for all subsequent data sent to the destination terminal. The destination terminal then effectively transitions to the light-encoding state 100, through the heavy-to-light transition 110.

It is important to note that the light-to-heavy threshold, $T_{lh}$, and the heavy-to-light threshold, $T_{hl}$, are separated by a coding hysteresis interval which prevents unnecessary toggling between the light-encoding state 100 and the heavy-encoding state 106 in borderline conditions. Thus, even though the affected terminal A transitions from the light-encoding state 100 to the heavy-encoding state 106 when the $CER_{light}$ 120 exceeds $T_{lh}$, the transition back from the heavy-encoding state 106 to the light-encoding state 100 does not occur when $CER_{light}$ 124 drops below $T_{lh}$. Rather, the transition to the light-encoding state 100 occurs when $CER_{light}$ 124 drops below $T_{hl}$ (which is lower than $T_{lh}$ by the coding hysteresis interval). Likewise, the affected terminal A does not switch to heavy-encoding state 106 until the $CER_{light}$ 120 again exceeds $T_{lh}$ (which is higher than $T_{hl}$ by the coding hysteresis interval).

The transitions between heavy and light coding may be achieved by commanding each originating terminal B to set a single bit in an ATM VPI or VCI field to a particular value, indicating the appropriate encoding rate to be used on the downlink. For example, setting the leading VPI bit to 0 may represent light encoding while setting the leading VPI bit to 1 may represent heavy encoding. The satellite may detect such changes in the VPI and apply the corresponding coding level to the data in the downlink. Under such a scheme, when an affected terminal A transitions from heavy-encoding state 106 to the light-encoding state 100, the switch-to-light notice 126 commands all originating terminals B to set the leading VPI bit in all the data addressed to the affected terminal A to 0. This allows the satellite relay system to use light coding on the data addressed to the affected terminal A.

Returning to FIG. 1, while in the heavy-encoding state 106, the affected terminal A also determines the CER of the heavy encoded data present in its downlink ($CER_{heavy}$) 128, and compares $CER_{heavy}$ 128 to the enter-suspension threshold $T_{hs}$ (which may be, for example, on the order of 1.5%). If the $CER_{heavy}$ 128 exceeds $T_{hs}$, the affected terminal A sends a stop-sending notice 130 to all originating terminals B (senders) and optionally the NOC, commanding them to suspend sending data to the affected terminal A. The affected terminal A transitions to the suspension state 114, through the enter-suspension transition 112. Thus, originating terminals B do not waste time, energy, and bandwidth transmitting data that the affected terminal A cannot decode properly due to poor signal reception. The enter-suspension threshold $T_{hs}$ represents the highest data error rate tolerable, above which it is more desirable to suspend sending data to the destination terminal than to consistently generate erroneous data.

Alternatively, if the $CER_{light}$ 124 exceeds $T_{hl}$ and $CER_{heavy}$ 128 is lower than $T_{hs}$ then the affected terminal A effectively remains in the heavy-encoding state 106, as illustrated by the maintain-heavy-encoding transition 108. Typically the enter-suspension and exit-suspension thresholds are higher than the light-to-heavy and heavy-to-light thresholds, because the enter-suspension and exit-suspension thresholds represent extreme signal degradation conditions.

The affected terminal A does not receive any data from originating terminals while in the suspended state 114. However, the affected terminal A still receives the downlink which typically contains heavy coded data addressed to other terminals. The destination terminal may therefore determine the Character Error Rate of such heavy coded data ($CER_{heavy}$) 132 and compare it to the exit-suspension threshold $T_{sh}$ (which may be, for example, on the order of 1.2%).

If the value of $CER_{heavy}$ 132 falls below $T_{sh}$, the affected terminal A may send a resume-sending notice 134 to all originating terminals B (senders) and optionally to the NOC, commanding them to resume sending data to the affected terminal A. The affected terminal A then transitions to the heavy-encoding state 106, through the exit-suspension transition 118. Otherwise, if $CER_{heavy}$ 132 exceeds $T_{sh}$, the affected terminal A remains in the suspension state 114 as illustrated by the maintain-suspension transition 116.

It is important to note that the enter-suspension threshold, $T_{hs}$, and the exit-suspension threshold, $T_{sh}$, are also separated by a suspension hysteresis interval which prevents unnecessary toggling between the heavy encoding state 106 and the suspension state 114 in borderline conditions. Thus, in the preferred embodiment, even though the affected terminal A transitions from the heavy-encoding state 106 to the suspension state 114 when the $CER_{heavy}$ 128 exceeds $T_{hs}$, the transition out of the suspension state 114 to the heavy-encoding state 106 does not occur when the $CER_{heavy}$ 132 drops below $T_{hs}$. Rather, the transition out of the suspended-state 114 occurs when the $CER_{heavy}$ 132 drops below $T_{sh}$ (which is lower than $T_{hs}$ by the suspension hysteresis interval). Likewise, the affected terminal A does not switch to the suspension state 114 until the $CER_{heavy}$ 128 again exceeds $T_{hs}$ (which is higher than $T_{sh}$ by the suspension hysteresis interval).

As will be seen below, coding changes applied to data in the uplink are completely independent of coding changes applied to data in the downlink, although the invocation of such changes is typically a result of a common cause, such as a gathering storm.

Figure 2:
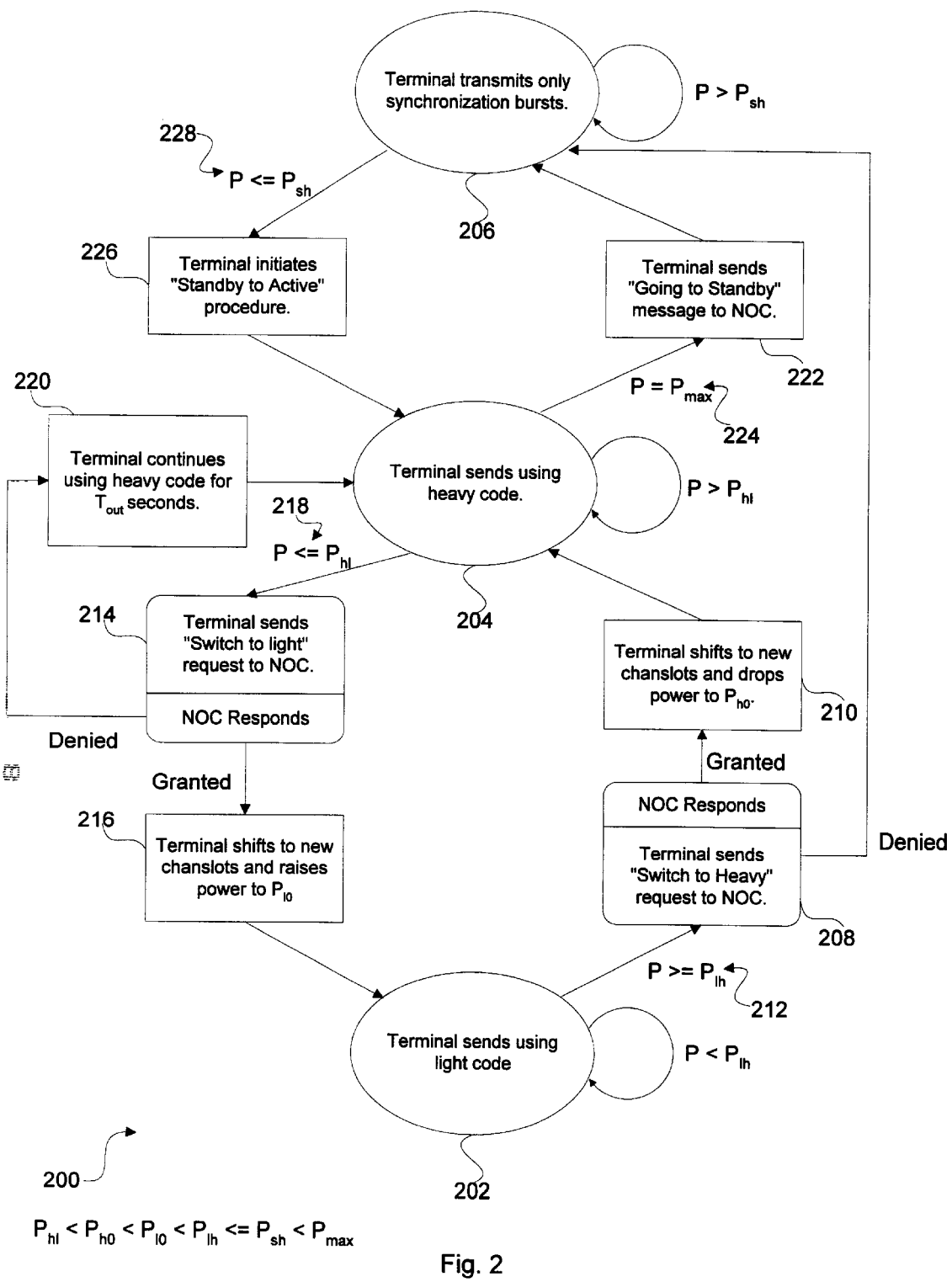
FIG. 2 illustrates an uplink State and Action Diagram for uplink adaptive error control coding according to the present invention.

Turning now to FIG. 2, that figure illustrates a state and action diagram 200 for a preferred embodiment of adaptive coding on the uplink. The diagram 200 shows a light-coding state 202, a heavy-coding state 204, and a standby state 206. Further illustrated in FIG. 2 is a heavy request block 208 and a heavy transition block 210 through which transitions may occur under heavy transition condition 212. Similarly, a light request block 214 and a light transition block 216 are illustrated through which transitions may occur under light transition condition 218. A timeout block 220 is associated with one possible branch in attempting to change from heavy to light coding. FIG. 2 also indicates a standby transition 222 (which occurs under standby condition 224) and a resume transition 226 (which occurs under resume condition 228).

Starting with the light-coding state 202, an affected terminal A is assumed to be transmitting light coded data in an uplink. The light coded data may be addressed to any particular destination terminal B and relayed through the communications satellite. The affected terminal A transmits at a particular power level, P, according, for example, to maintain a desired signal to noise ratio (SNR) at the satellite receiver which typically has two distinct values depending on whether the light or heavy code is in use. The affected terminal A may receive feedback from the satellite or an independent monitoring system to adjust P to meet the desired SNR. The power level P (typically expressed in Watts) of the final amplifier of the affected terminal A is one example of a power indicator suitable for use with the present adaptive coding method.

Figure 5:
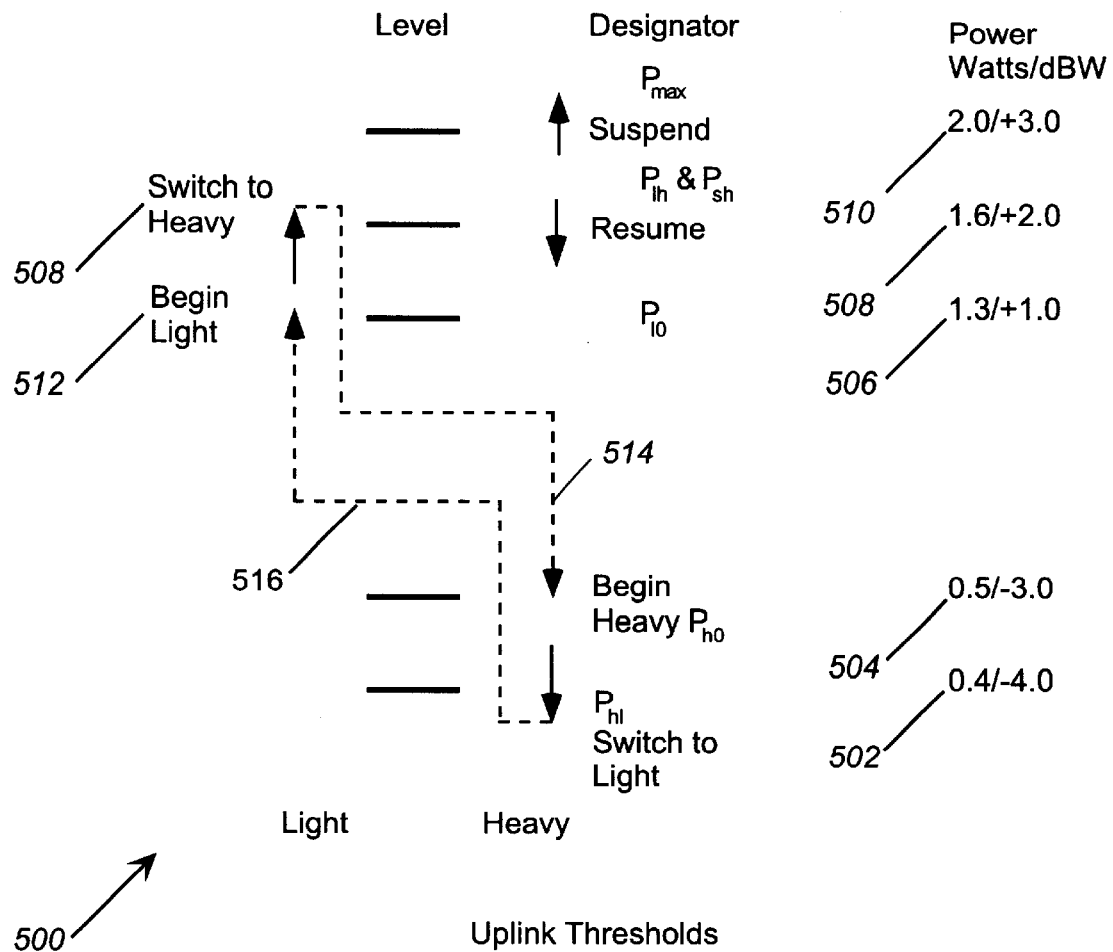
FIG. 5 shows one possible set of uplink thresholds suitable for use with the present invention.

The discussion below of the operation of the present invention as shown in FIG. 2 is supplemented by the uplink threshold diagram 500 illustrated in FIG. 5. The threshold diagram 500 shows, as examples, power thresholds of 0.4 W (502), 0.5 W (504), 1.3 W (506), 1.6 W (508), and 2.0 W (510) and the relationship between heavy and light coding and differing power levels. The relationships will be discussed in more detail below. As an initial overview, starting with the assumption that the affected terminal A is operating with P less than the 1.6 W threshold 508 ($P_{lh}$ below) and using light coding on its uplink. When the power control system causes P to exceed the 1.6 W threshold 508, however, the affected terminal preferably switches to heavy coding and drops its power to the 0.5 W threshold 504 ($P_{h0}$ below), as illustrated by the transition 514. When the power required at the affected terminal A drops below the 0.4 W threshold 502 ($P_{hl}$ below) while it is using heavy coding on its uplink, the affected terminal A preferably switches to light coding and increases its power to the 1.3 W threshold 506 which is used initially with the light code, as illustrated by the transition 516.

As will also be discussed in more detail below, the affected terminal A may enter a suspension state. For example, when the power required at the affected terminal rises above 2.0 W ($P_{max}$ below), at which point the affected terminal A should already be using heavy mode, the originating terminal may suspend all transmissions, except, optionally, synchronization bursts. When the power required thereafter falls below the 1.6 W threshold 508 ($P_{sh}$ below), the originating terminal may then resume transmissions in the heavy coded or light coded states and associated power levels.

Note that the final amplifier power, P, at the affected terminal A required may vary substantially as a result of changing propagation conditions, even though the SNR at the satellite is essentially constant. The affected terminal A, however, cannot increase power indefinitely to meet the desired SNR. Thus, a light-to-heavy threshold, $P_{lh}$, is defined which represents the point at which the originating terminal will switch to a heavier coding. The heavier coding provides additional error correcting capabilities over the light coding and thereby actually allows the affected terminal A to reduce its power output, P while maintaining a constant error rate at the satellite. As an example, light coded data may be generated with a light "rate 1" inner block code (i.e., no inner code), while the heavy coded data may be generated, preferably, with a heavy rate 1/2 inner block code. Because the two to one relationship typically means that the affected terminal A will require two time slots to transmit the heavy coded data for what would have been every one light coded data timeslot, a processing satellite may adapt to the change in coding without significant changes or complex adaptation in the processing of the data.

Returning to FIG. 2, the originating terminal remains in the light-coded state 202 while $P<P_{lh}$. When directed by the satellite to increase its transmitter power above $P_{lh}$ (due to, for example, increasing rain conditions), the affected terminal A sends a switch-to-heavy request to the NOC. This process is illustrated in FIG. 2 as heavy transition condition 212 and heavy request block 208. Assuming that the NOC grants the request (the grant may be transmitted back through the satellite to the affected terminal A), the affected terminal A transitions through the heavy transition block 210 to the heavy-coded state 204. As part of the transition, the affected terminal A may change to a new frequency channel or timeslot ("chanslot" in FIG. 2) as commanded by the NOC, and reduces its power to a predetermined start point for heavy coding, $P_{h0}$, typically 5 dB below $P_{lh}$.

If, however, the NOC denies the request, the affected terminal A transitions to the standby state 206. In the standby state 206, the affected terminal A, because of poor signal conditions, does not attempt to transmit data to a destination terminal B. Thus, the affected terminal A transitions from active transmission to a standby condition. An active-to-standby procedure may be executed in which, for example, the affected terminal ceases transmission, except for synchronization bursts.

Returning to the heavy-coded state 204, the affected terminal A continues to transmit heavy-coded data while $P>P_{hl}$. In other words, the affected terminal A remains in the heavy-coded state 204 as long as it needs more than $P_{hl}$ power to follow the direction of the power control algorithm. It is noted that the affected terminal may gradually increase or decrease its transmission power, P, while in the heavy-coded state 204, as it did while in the light-coded state 202. However, upon reaching a predetermined maximum transmit power, $P_{max}$, typically the rated power of the transmitter, the affected terminal A informs the NOC that it is transitioning to the standby state 206. These steps correspond to the standby condition 224 and standby transition 222.

The affected terminal A remains in the standby state 206 while the power required to send synchronization bursts remains greater than $P_{sh}$. Note that, in certain embodiments, $P_{sh}$ may have the same value of $P_{lh}$. When P falls below $P_{sh}$, the affected terminal A transitions 228, to active status using a heavy uplink 204 initiating a standby-to-active procedure 226 using the heavy code. During the procedure, the affected terminal A may execute any power-on, registration, or awaken signaling designed to allow the affected terminal A access to the communications system. Subsequently, the affected terminal A may transition to routine transmissions to destination terminals B using the heavy-coded state 204. Alternatively if propagation conditions have improved greatly since entering the standby state 206, the affected terminal A may transition to the light-coded state 202, preferably in response to a power measurement and associated light transition condition 218.

Continuing with reference to the heavy-coded state 204, the affected terminal, as noted above, continues to monitor its power level, P. When P falls below the high-to-low threshold $P_{hl}$, the affected terminal A transitions to the light request block 214 according to the light transition condition 218. In the light request block 214, the affected terminal A sends a request to the NOC to resume light-coded data transmission (as the degrading uplink signal conditions have abated). In the event that the NOC grants the request (the grant may be transmitted back through the satellite to the affected terminal A), the affected terminal A transitions through the light transition block 216 to the light-coded state 202. As part of the transition, the affected terminal A may change to a new frequency channel or timeslot ("chanslot" in FIG. 2) as commanded by the NOC, and increase its power to a predetermined start point for light coding, $P_{l0}$.

On the other hand, if the NOC denies the request, the affected terminal A transitions through the timeout block 220. According to the timeout block 220, the affected terminal A continues to send heavy-coded data for a predetermined amount of time, for example, $T_{out}$ seconds. The value of $T_{out}$ may be adjusted according to the particular communications system at issue and may range from several seconds to many tens of seconds, or more. After continuing heavy coded transmission for $T_{out}$ seconds, the affected terminal A transitions back to the heavy-coded state 204 where it proceeds as noted above to determine whether it should remain in the heavy-coded state 204.

Hysteresis prevents the system from rapidly toggling between the light-coded, heavy-coded, and standby states. The initial heavy power level $P_{h0}$ and the heavy-to-light threshold $P_{hl}$, in particular, are separated by a coding hysteresis interval, typically 1.0 dB. Thus, $P_{lh}$ may be 0.5 Watts, while $P_{hl}$ may be 0.4 Watts (for example). Furthermore, $P_{max}$ is separated from $P_{sh}$ by a standby hysteresis interval. As an example, $P_{max}$ may be 2 Watts, while $P_{sh}$ may be 1.6 Watts. It is reiterated that a substantial decrease, typically 5.0 dB in P accompanies a transition from light to heavy (i.e., from $P_{lh}$ to $P_{h0}$), and conversely.

Figure 3:
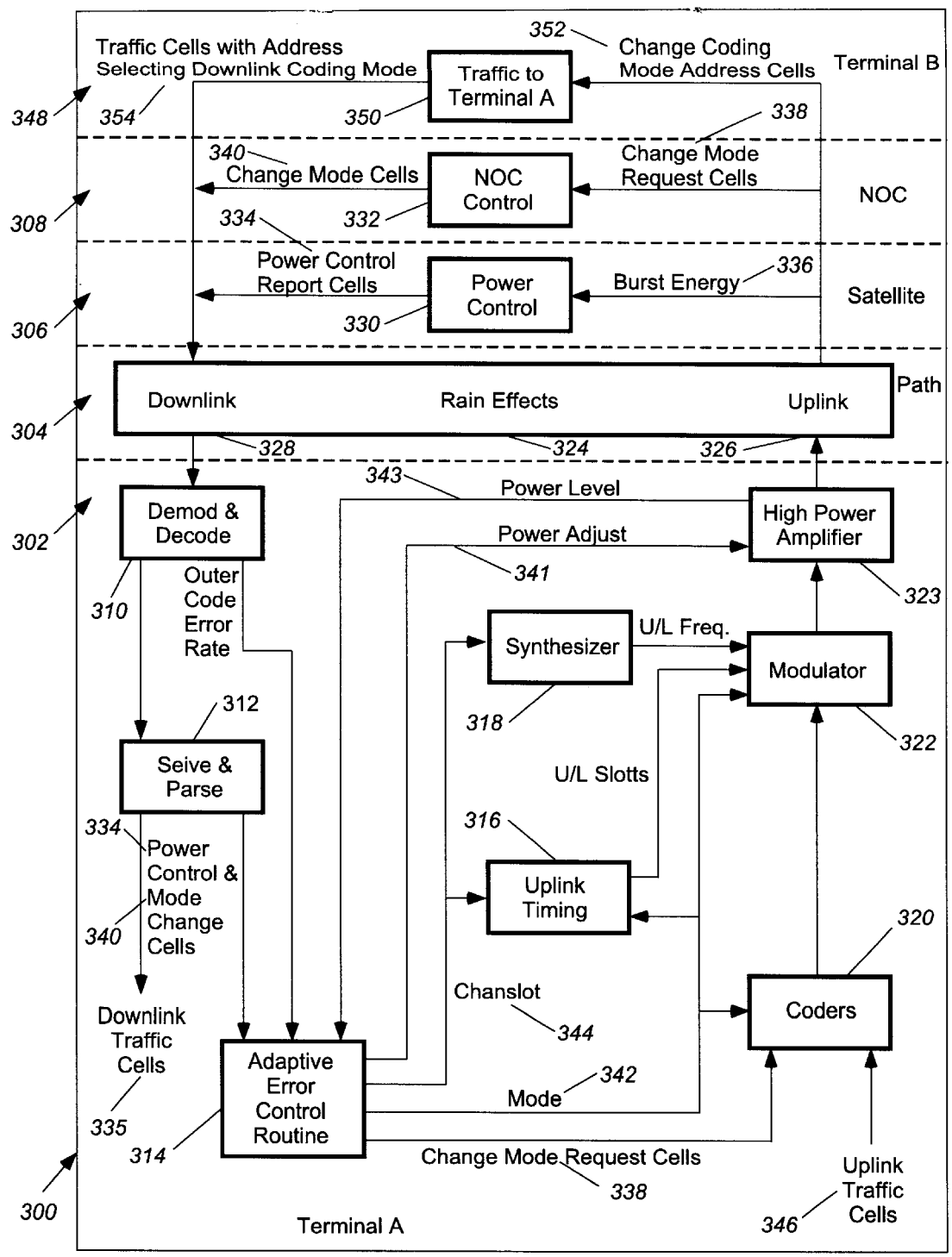
FIG. 3 depicts a block diagram illustrating one possible implementation of uplink adaptive error control coding in a processing satellite system.

Turning to FIG. 3, that figure depicts a block diagram 300 of one possible implementation of adaptive error coding on the uplink. The diagram 300 shows an affected terminal A 302, the atmospheric communication path 304, the satellite relay system 306 and the NOC 308, as well as a corresponding terminal B 348. The affected terminal A 302 includes a demodulator and decoder 310, a parser 312, and an adaptive error control routine 314 implementing the steps noted above with respect to FIGS. 1 and 2. The affected terminal 302 also includes an uplink timing device 316, a frequency synthesizer 318, coders 320, a modulator 322, and a transmitter with high power amplifier 323. The diagram 300 illustrates the rain effects 324 as an example of the atmospheric conditions and signal degradation present in the communication path 304, which may affect the signal quality in both the uplink 326 as well as the downlink 328 although the effect may be unequal in the links. The corresponding terminal B 348 generally shares the same structure as the originating terminal A, and is thus shown in highly abbreviated form as simply including a traffic block 350 that generates and sends traffic to the originating terminal A 302. The diagram 300 further shows the power control 330 and the NOC control 332.

As diagram 300 illustrates, while the affected terminal 302 is initially transmitting uplink data using light encoding the affected terminal 302 receives downlink data 328 which includes power control information 334 from the power control 330 of the satellite 306. The downlink information is demodulated and decoded by the demodulator and decoder 310, and parsed by parser 312 (to extract, for example, data relating to power control or directions relating to adaptive coding). In the preferred embodiment, the power control information 334 commands changes using the power adjustment control 341 to the affected terminal's 302 transmission power 343 in response to the satellite power control 330 using the burst energy 336 from the uplink 326. The power control information 334 is used in the adaptive error control routine 314, together with the power level 343 (representing the power level P in FIG. 2, above). The power level 343 may thereby be used to determine whether, according to the heavy transition condition 212 for example, a transition to the heavy-coded state 204 is necessary. Similarly, changes in power level P may initiate transitions to light coded state 202 or standby state 206.

Referring back to FIG. 3, if the adaptive error control routine 314 determines that the originating terminal 302 needs to encode subsequent uplink data using the heavy encoding level, the appropriate "change mode" request cells 338 are issued. The "change mode" request cells 338 are encoded by the coders 320, modulated by the modulator 322, and sent to the NOC control 332 in the uplink 326 (this step corresponds to the heavy request block 208 in FIG. 2). When the NOC control 332 grants the request of the affected terminal A 302 to transmit using heavy coding, the appropriate "change mode" cells 340 are prepared, and sent to the originating terminal A 302 in the downlink 328. The "change mode" cells 340 again go through the demodulator and decoder 310, as well as the parser 312. Using the change mode cells 340, the adaptive error control routine 314 sets the mode parameter 342 and the frequency channel and timeslot information 344 to the new values reflecting heavy encoding of subsequent transmissions. These new parameter values are used by the uplink timing device 316, the frequency synthesizer 318, the coders 320, and the modulator 322 to encode subsequent traffic cells 346 using the heavy error coding, at the correct uplink frequency and timeslot (this step corresponds to a transition to the heavy coded state 204 in FIG. 2). Furthermore, the adaptive error control routine 314 modifies the power adjustment control 341 to drop P to the initial level $P_{h0}$ for heavy code uplink transmission.

The affected terminal 302 continues to receive power control information 334 from the power control 330 of the satellite 306 and to adjust its power level 343 according to the power adjustment control 341. When the degradation of the signal quality due to rain effects 324 decreases, the satellite's power control 330 directs the affected terminal A 302 to lower its transmit power 343. When the transmit power 343 drops below the threshold $P_{hl}$, the originating terminal A 302 may initiate a change mode procedure as described above, from heavy to light coding on the uplink 326.

Adaptive error coding on the downlink can be implemented using a corresponding system. However, in the downlink implementation, the "change mode" request cells 338 need not be sent to the NOC control 332. Rather, the "change mode" request cells 338 will be sent through the satellite 306 to each of the originating terminals B (including, for example, the same structure used in the originating terminal 302) and which are communicating with the originating terminal 302.

For example, the originating terminal B 348 may set the VPI field in ATM data cells addressed to the affected terminal A 302 to have the data encoded by the satellite 306 using heavy coding on the downlink. Thus, the change of coding mode address cells 352 received at the originating terminal B 348 will cause the subsequent traffic cells 354 to bear the appropriate address indication for the type of coding desired on the downlink.

Please note that the traffic cells 354 from originating terminal B 348 and the change mode cells 340 from the NOC 308 are shown in FIG. 3 only in terms of the downlink 328. In actuality, these cells must first traverse the uplink 326 and transit the satellite 306 prior to entering the downlink 334. From the perspective of affected terminal A, however, these cells have relevance only in the downlink. Therefore for clarity, the transit of the satellite by these cells is not shown in FIG. 3. Similarly, the change coding mode address cells 352 sent to the corresponding terminal B actually transit the satellite and arrive in the downlink 328. However, since these cells are relevant solely in the uplink for the affected terminal A, they are shown only on the uplink 326 side of FIG. 3, again for clarity.

The overall result of the adaptive coding scheme is to provide downlink cells 335 that arrive with the appropriate downlink coding level and to accept uplink cells 346 at the appropriate uplink coding level.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. In a satellite communications system including terminals which send and receive data through a satellite, a method for adaptive error control coding of data in a downlink the method comprising the steps of:

receiving at a destination terminal a downlink including light coded data transmitted by a satellite;

determining a first data error rate associated with said light coded data;

when said first data error rate exceeds a first threshold, commanding said originating terminal to subsequently select transmission of heavy coded data having a code rate less than said light coded data in said downlink to said destination terminal;

when said first data error rate falls below a second threshold, commanding said originating terminal to subsequently select transmission of light coded data in said downlink to said destination terminal;

establishing an enter-suspension threshold;

determining a second data error rate associated with said heavy coded data; and commanding said first originating terminal to suspend transmission when said second data error rate exceeds said enter-suspension threshold, wherein said first threshold is different from said second threshold and said enter-suspension threshold.

2. The method of claim 1, further comprising the steps of:

establishing an exit-suspension threshold separated from said enter suspension threshold by a suspension hysteresis interval;

commanding said originating terminal to resume transmission when said second data error rate falls below said exit-suspension threshold.

3. The method of claim 2, wherein said step of commanding to resume transmission further comprises commanding said originating terminal to select transmission of heavy coded data in said downlink to said destination terminal.

4. The method of claim 1, wherein said step of commanding to suspend transmission further comprises commanding a Network Operation Control (NOC) to suspend transmission to said destination terminal.

5. The method of claim 2, wherein said step of commanding to resume transmission comprises commanding originating terminal to resume transmissions.

6. The method of claim 2, wherein said step of commanding to resume transmission comprises commanding a Network Operation Control (NOC) to resume transmission to said destination terminal.

7. In a satellite communications system including terminals which send and receive data through a satellite, a method for adaptive error control coding of data in a downlink, the method comprising the steps of:

receiving at a destination terminal a downlink including light coded data transmitted by a satellite;

determining a first data error rate associated with said light coded data;

when said first data error rate exceeds a first threshold, commanding said originating terminal to set an address bit to a heavy coding value having a code rate less than said light coded data in said downlink to said destination terminal; and when said first data error rate falls below a second threshold, commanding said originating terminal to subsequently select transmission of light coded data in said downlink to said destination terminal, wherein said first threshold is different from said second threshold.

8. The method of claim 7, further comprising the step of applying, at a satellite, an inner code selected by said address bit to form said heavy coded data in said downlink.

9. In a satellite communications system including terminals which send and receive data through a satellite, a method for adaptive error control coding of data in a downlink, the method comprising the steps of:

receiving at a destination terminal a downlink including light coded data transmitted by a satellite;

determining a first data error rate associated with said light coded data;

when said first data error rate exceeds a first threshold, commanding said originating terminal to subsequently select transmission of heavy coded data having a code rate less than said light coded data in said downlink to said destination terminal; and when said first data error rate falls below a second threshold, commanding said originating terminal to set and address bit to a light coding value, wherein said first threshold is different from said second threshold.

10. The method of claim 9, further comprising the step of applying, at a satellite, an inner code selected by said address bit to form light coded signals in the downlink.

11. The method of claim 1, wherein said step of determining a second data error rate comprises determining a second data error rate associated with data in said downlink originating at a second originating terminal.

12. The method of claim 8, wherein said step of applying an inner code comprises applying a heavy inner code having a code rate half that of a light inner code.

13. The method of claim 2, wherein said step of commanding to subsequently select transmission of heavy coded data comprises the step of selecting transmission of data in said downlink of heavy coded data having a code rate half that of light coded data.

14. In a satellite communications system including a Network Operation Center (NOC) and terminals which send and receive data through a satellite, a method for adaptive error control coding data in an uplink, the method comprising the steps of:

sending in uplink transmissions, by an originating terminal, light coded data addressed to a first destination terminal;

monitoring a power level associated with said uplink transmissions;

when said power level exceeds a first threshold, subsequently sending heavy coded data in said uplink transmissions; and when said power level exceeds a second threshold, suspending, by said originating terminal, subsequent transmissions, wherein said first threshold is different from said second threshold.

15. The method of claim 14, further comprising the steps of:

when said power level falls below a third threshold, subsequently sending light coded data in said uplink transmissions.

16. The method of claim 14, further comprising the steps of:

resuming transmissions, by said originating terminal, when said power level falls below a fourth threshold separated from said second threshold by a suspension hysteresis interval.

17. The method of claim 14, wherein said step of subsequently sending heavy coded data further comprising the step of sending a switch-to-heavy request and when said switch-to-heavy request is denied, commanding said originating terminal to enter standby mode.

18. The method of claim 16, wherein said step of resuming transmissions comprises resuming transmissions of heavy coded data from said originating terminal.

19. The method of claim 16, wherein said step of resuming transmissions comprises resuming transmissions of light coded data from said originating terminal.

20. The method of claim 16, wherein said step of suspending subsequent transmissions comprises suspending transmissions other than synchronization bursts.

21. The method of claim 14, wherein the step of subsequently sending heavy coded data comprises the step of applying an inner code generating said heavy coded data.

22. The method of claim 21, wherein the step of applying an inner code to generate said heavy coded data comprises applying an inner code having a code rate half that of light coded data.

23. The method of claim 15, wherein the step of subsequently sending light coded data comprises the step of applying an inner code generating said light coded data.

24. The method of claim 23, wherein the step of applying an inner code to generate said light coded data comprises applying an inner code having a code rate twice that of heavy coded data.

* * * * *